United States Patent Office 3,124,550
Patented Mar. 10, 1964

3,124,550
STABLE NON-DRAINING COMPOSITION OF MATTER AND METHOD OF MAKING SAME USING SOLUBLE HEAVY METAL SALT
Alvaro Salgado, Union, and Anthony R. Manyak, Pompton Plains, N.J., assignors to Reichhold Chemicals, Inc., White Plains, N.Y.
No Drawing. Filed July 18, 1960, Ser. No. 43,329
12 Claims. (Cl. 260—22)

This invention relates to improved stable non-draining compositions of matter and, more particularly, to mixtures of unsaturated polyesters and polymerizable monomers containing $>C=CH_2$ groups.

Compositions containing unsaturated polymerizable monomers and unsaturated alkyd resins of dihydric alcohols and unsaturated dicarboxylic acids are referred to as "unsaturated polyester resins" herein and in the claims appended hereto and are known to be capable of catalytically polymerizing to insoluble and infusible copolymers. Practical uses of these polyesters include clear and filled castings, laminates, and surface coatings. In many of these uses or applications, such as in laminates and surface coatings, a catalyzed polyester is applied to inclined or even vertical surfaces, and this is generally accompanied by this following undesirable effect. While the unsaturated polyester resin necessarily contains a certain minimum amount of vinyl monomer in order to insure proper wetting, drainage occurs which results in uneven surfaces and resin-starved areas.

One attempt to solve this draining problem has been to employ additives, such as silica aerogel. However, this additive is well known to settle and to cause drifting of the gelling and curing characteristics, as well as decreasing the resin stability. On the other hand, organic thickening agents are well known to require complicated blending equipment and their use, even with substantial blending, falls far short of the desired goal. Heretofore, remedial efforts, both process and composition-wise, have failed to uncover a satisfactory non-draining high-viscosity product when containing, as a major component, unsaturated polyesters.

It is an object of the invention to provide non-draining, high-viscosity unsaturated polyester resins.

This and other objects will be apparent from the following specification and the claims appended thereto.

It has been discovered that these and other objects are attained by adding a minor amount of a soluble salt of a carboxylic acid and of a heavy metal selected from groups VII and VIII of the periodic chart to unsaturated polyester resins comprising polymerizable monomers having at least one $>C=CH_2$ group, and alkyds of dihydric alcohols, polymeric fatty acids containing dimers and trimers, and alpha, beta, ethylenically unsaturated dicarboxylic acids. Among the suitable heavy metal salts which may be used are: cobalt-2-ethylhexoate, cobalt naphthenate, cobalt abietate, cobalt linoleate, cobalt laurate, iron-2-ethylhexoate, iron naphthenate, iron oleate, manganese-2-ethylhexoate, manganese naphthenate, manganese oleate, manganese ricinoleate, manganese resinate, manganese para-tertiary butyl benzoate, etc. Although all these salts have been found generally suitable for the present invention, salts of 2-ethyl hexoic acid and of naphthenic acid have been found to give particularly good results.

The amount of metal added in the form of its salts to the resin composition includes about up to 1.0 percent as metal, while the lower limit of about 0.05 percent of metal is generally required as a threshold amount. For optimum results, however, it is generally preferred to add the metal salts in amounts corresponding to between about 0.1 percent and about 0.4 percent metal.

Although it has been known before to use such metal salts in conjunction with unsaturated polyesters, no appreciable increase in viscosity and non-draining properties resulted therefrom. The composition of the present invention particularly utilizes unsaturated polyester resins modified with polymeric fatty acids, as only such resins show the desired phenomenon upon formulation with the above-mentioned metal salts. The unsaturated polyester resins of the present invention are generally made by esterifying under elevated temperature conditions, dihydric alcohols in slight stoichiometric excess with polymeric fatty acids and alpha, beta, unsaturated dicarboxylic acids until an acid number of between about 5 and about 80 is reached, and preferably between about 10 and about 50. The resultant alkyd resin is blended with a stabilizer and a polymerizable monomer having at least one $>C=CH_2$ group. The weight ratio of the alkyd to the monomer may be varied between about 95 to 5 and 5 to 95. For most practical applications, it is generally preferred to employ such a ratio in which a syrupy blend results. Depending upon the kind of monomer and upon the behavior of the alkyd resin, the preferred weight ratio is thus between about 55 parts alkyd to about 45 parts monomer and about 85 parts alkyd to about 15 parts monomer.

The dihydric alcohols used as starting materials or as reactants for this esterification reaction include saturated and unsaturated aliphatic glycols, such as ethylene glycol, 1,2-propylene glycol, 1,3-propylene glycol, 1,2-butylene glycol, 1,4-butylene glycol, 1,5-pentane diol, the hexylene glycols, neopentyl glycol, 1,2-butene-1,4-diol, etc. They also include dihydroxy polyethers, such as diethylene glycol. dipropylene glycol, triethylene glycol and also the higher polyglycols of waxy consistency. Also, cycloaliphatic diols, such as 2,2-isopropylidene dicyclohexanol (hydrogenated Bisphenol A) are utilized.

The polymeric fatty acids are usually available as mixtures containing both dimerized and trimerized fatty acids. They are usually made by polymerizing fatty acids containing at least twelve carbon atoms and at least one carbon to carbon double bond, such as dodecylenic acid, palmitoleic acid, oleic acid, ricinoleic acid, petroselinic acid, vaccenic acid, linoleic acid, linolenic acid, eleostearic acid, licanic acid, parinaric acid, gadoleic acid, arachidonic acid, cetoleic acid, erucic acid, selacholeic acid, nervonic acid, etc. The polymeric fatty acids may also be prepared by polymerizing esters thereof of monohydric alcohols, saponifying the resultant polymeric esters and isolating the free polymeric acids. Although all the fatty acids listed above, after being polymerized, may be used in the present invention, it is generally preferred from the standpoint of economy and availability to employ mixtures that occur in natural fats and oils, said mixtures being frequently termed "fat acids." The polymerization is effected by heat or by anionic catalysts, or by both, whereby a mixture results containing both dimers and trimers fatty acids, as well as unreacted starting material which may be removed. Although in the present invention it is preferred to employ polymeric fatty acids which contain the dimer acids as the major constituent, it is also possible to use substantial amounts of trimer acids, particularly if monomeric fatty acid is simultaneously employed.

The alpha, beta, ethylenically unsaturated dicarboxylic acids employed in obtaining the unsaturated polyesters include maleic acid, fumaric acid, aconitic acid, itaconic acid, mono chloromaleic acid, etc., and the corresponding anhydrides of the cis-acids. These ethylenically unsaturated dicarboxylic acids may be partially replaced with either saturated dicarboxylic acids or with dicarboxylic acids which contain only benzenoid unsaturation. This group includes adipic acid, azelaic acid, ortho phthalic acid, isophthalic acid, terephthalic acid, tetrahydrophthalic acid, hexahydrophthalic acid, etc., as well as the anhydrides of those acids which are capable of forming anhydrides.

For each mol of alpha, beta, unsaturated dicarboxylic acid, there may be used between about 0.05 mol and about 1.0 mol of polymeric fatty acid. In order to obtain optimum performance, between about 0.1 and about 0.5 mol is preferred. Further, for each mol of the alpha, beta, unsaturated dicarboxylic acid, up to 10 mols of dicarboxylic acids containing no unsaturation other than benzenoid can be employed.

The polymerizable monomers include vinyl monomers, such as styrene, vinyl toluene, diallyl phthalate, triallyl cyanurate, triallyl isocyanurate, triallyl citrate, diallyl maleate, diallyl fumarate, the isomers of dichlorostyrene, etc. These monomers also include methyl methacrylate, ethyl methacrylate, methyl acrylate, ethyl acrylate, allyl methacrylate, ethylene dimethacrylate, cyclohexyl methacrylate, tetramethylene dimethacrylate, polyethylene dimethacrylate, etc.

Stabilizers for the unsaturated polyester resins include compounds of phenolic and quinoid structure, such as hydroquinone, tertiary butyl catechol, quinone, etc. Other suitable stabilizers include quaternary ammonium salts, esters of phosphorous acid, copper salts, gaseous oxygen, etc.

The unsaturated polyester resins can be cured to insoluble and infusible copolymers by the use of curing agents such as peroxides and hydroperoxides, such as benzoyl peroxide, methyl ethyl ketone peroxide, cyclohexanone peroxide, lauroyl peroxide, tertiary butyl perbenzoate, diacetylperoxide, cumene hydroperoxide, etc. For even faster cure, peroxides are often used in conjunction with metallic and amine promoters. Metallic promoters include salts of heavy metals, such as cobalt naphthenate, cobalt octoate, manganese octoate, ferric naphthenate, cupric naphthenate, etc. The amine promoters include dimethyl aniline, diethyl aniline, methyl ethyl aniline, etc.

The following examples are presented for the purpose of illustrating and describing the present invention and are not intended to be limited thereto.

EXAMPLES (A) *Resin Preparation*

*Resin 1.*—To a three-necked 5000 ml. glass flask fitted with a carbon dioxide sparge tube, stirrer, vapor outlet and heating mantle, there was charged:

|  | Gms. |
|---|---|
| Maleic anhydride (18.0 mols) | 1764 |
| Dimerized soybean oil fatty acids (3.0 mols) | 1800 |
| 1,2-propylene glycol (23.1 mols) | 1756 |

This mixture was slowly heated with stirring under a carbon dioxide atmosphere to about 200–215° C. and the temperature held at this level until the acid number of the mixture had dropped below 40. The mixture was then cooled to 170° C., whereupon 0.58 gm. of hydroquinone was added. A 4000 gm. portion of this mixture was slowly poured, with good agitation, into a large beaker containing 3280 gms. styrene and 0.36 gm. of tertiary butyl catechol. External cooling was applied to the beaker, so that the blend temperature did not exceed 70° C. The yield was 7280 gms. of polyester resin which had a viscosity of 280 cps.

*Resin 2.*—For comparison, a conventional polyester resin was made by the same process described above from

|  | Gms. |
|---|---|
| Maleic anhydride (16.0 mols) | 1568 |
| Phthalic anhydride (8.0 mols) | 1184 |
| 1,2-propylene glycol (25.6 mols) | 1944 |

An alkyd product of 4100 gms. having an acid number of 38 was obtained. To this was added 0.54 gm. of hydroquinone as a stabilizer therefor. This mixture was blended with 2720 gms. of styrene and 0.34 gm. tertiary butyl catechol. The yield was 6820 gms. of resin having a viscosity of 275 cps.

(B) *Effect of Heavy Metal Salts on the Resin*

To demonstrate the increase in viscosity, the resins described above were mixed with the heavy metal salts listed in the table below. Viscosities were measured with a Brookfield Viscometer.

The metal salts used were:

Cobalt octoate solution in xylol containing 12% metal,
Iron naphthenate solution in xylol containing 6% metal,
Manganese naphthenate solution in xylol containing 6% metal.

INFLUENCE OF METAL SALTS ON THE VISCOSITY OF UNSATURATED POLYESTER RESINS CONTAINING POLYMERIC FATTY ACIDS.

| Composition | Viscosities | |
|---|---|---|
|  | Resin 1, cps. | Resin, 2 cps. |
| Straight resin | 280 | 275 |
| Resin + 0.12% cobalt (as metal) | 430 | 208 |
| Resin + 0.24% cobalt (as metal) | 1,240 | 200 |
| Resin + 0.36% cobalt (as metal) | 15,000 | 333 |
| Resin + 0.24% iron (as metal) | 1,350 | 300 |
| Resin + 0.24% manganese (as metal) | 1,520 | 300 |

As the table demonstrates, only polyester resins containing polymeric fatty acids show a substantial increase in viscosity when a heavy metal salt is added.

The resin compositions listed in the table above were mixed with 1.0 percent of a 60 percent solution of methyl ethyl ketone peroxide in dimethyl phthalate, 0.07 percent dimethyl aniline, and 0.03 percent paraffine wax, the wax being added to obtain tack-free surfaces. These mixtures were brushed on a vertical glass mat. Resin 1, straight, and resin 2, straight, and with metal salts added showed excessive drainage, while resin 1 with the metal salts was virtually non-draining and gave void-free laminates.

By virtue of their controlled flow characteristics, the resins of the present invention are also very useful in molding applications.

We claim:

1. A stable non-draining resin composition which comprises a polymerizable blend of (A) an unsaturated polyester resin of an aliphatic saturated dihydric alcohol, a polymeric fatty acid having at least 24 carbon atoms and containing the dimer as a major constituent, and an alpha, beta, ethylenically unsaturated dicarboxylic acid; (B) a miscible, polymerizable monomer having at least one carbon-to-carbon double bond and a boiling point above 60° C.; and a minor amount of a soluble salt of a carboxylic acid and of a heavy metal selected from groups VII and VIII of the periodic chart the amount of added metal salt being from 0.05 to 1% by weight of the resin composition calculated in terms of the metal present in the salt.

2. The composition of claim 1 wherein the heavy metal is selected from a group consisting of manganese, iron and cobalt.

3. A composition of claim 1, wherein the heavy metal is manganese.

4. A composition of claim 1, wherein the heavy metal is iron.

5. A composition of claim 1, wherein the heavy metal is cobalt.

6. A resin composition as set forth in claim 1 wherein the added metal salt is within the range of 0.1 to 0.4% by weight of the resin composition, calculated in terms of the metal present in the salt.

7. A resin composition as set forth in claim 1 wherein the polymerizable monomer is styrene.

8. A stable non-draining copolymerizable composition comprising a polymerizable mixture of (A) an unsaturated polyester of an aliphatic saturated dihydric alcohol, a polymeric fatty acid having at least 24 carbon atoms and containing the dimer as a major constituent, and an alpha, beta, ethylenically unsaturated dicarboxylic acid; (B) a liquid, miscible polymerizable monomer having at least one >C=CH$_2$ group; and between about 0.01 and about 1.0% by weight, based on the combined weight of (A) and (B), of at least one heavy metal selected from groups VII and VIII of the periodic chart, said metal being in the form of a soluble salt of a carboxylic acid.

9. A method of increasing the viscosity of a resin composition, thereby rendering the resin non-draining, said method comprising adding a small amount of a soluble heavy metal salt of a carboxylic acid, wherein the metal is selected from groups VII and VIII of the periodic chart, to a mixture comprising (A) an unsaturated linear polyester resins of aliphatic, saturated dihydric alcohol, a polymeric fatty acid having at least 24 carbon atoms and containing the dimer as a major constituent, and an alpha, beta, ethylenically unsaturated dicarboxylic acid; and (B) a miscible, polymerizable liquid monomer having at least one carbon-to-carbon double bond, the amount of added metal salt being from 0.05 to 1% by weight of the resin composition calculated in terms of the metal present in the salt.

10. A method of claim 9, wherein the heavy metal is manganese.

11. A method of claim 9, wherein the heavy metal is iron.

12. A method of claim 9, wherein the heavy metal is cobalt.

References Cited in the file of this patent

UNITED STATES PATENTS

| | | |
|---|---|---|
| 2,308,498 | Earhart et al. | Jan. 19, 1943 |
| 2,429,219 | Cowan et al. | Oct. 21, 1947 |
| 2,757,160 | Anderson | July 31, 1956 |
| 2,850,469 | Christenson | Sept. 2, 1958 |
| 3,006,876 | Delius et al. | Oct. 31, 1961 |

OTHER REFERENCES

Chatfield: Varnish Constituents, Leonard Hill, Limited, London, 1953, 868 pages (pages 529 and 585–589 relied on).